United States Patent
Greenway, Jr. et al.

(10) Patent No.: US 10,740,887 B2
(45) Date of Patent: *Aug. 11, 2020

(54) METHOD AND SYSTEM FOR AUTOMATED VIDEO IMAGE FOCUS CHANGE DETECTION AND CLASSIFICATION

(71) Applicant: PANASONIC I-PRO SENSING SOLUTIONS CORPORATION OF AMERICA, Rolling Meadows, IL (US)

(72) Inventors: Roger B. Greenway, Jr., Franklin, TN (US); Jonathan N. Thompson, Houston, TX (US); James H. Whitcomb, Jr., Houston, TX (US); Stephen B. Greenway, Hot Springs, AR (US)

(73) Assignee: PANASONIC I-PRO SENSING SOLUTIONS CORPORATION OF AMERICA, Rolling Meadows, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,891

(22) Filed: Jun. 7, 2019

(65) Prior Publication Data

US 2019/0295243 A1 Sep. 26, 2019

Related U.S. Application Data

(63) Continuation of application No. 15/211,378, filed on Jul. 15, 2016, now Pat. No. 10,366,482.
(Continued)

(51) Int. Cl.
*G06T 7/00* (2017.01)
*H04N 17/00* (2006.01)
(Continued)

(52) U.S. Cl.
CPC .............. *G06T 7/0002* (2013.01); *G06K 9/20* (2013.01); *G06K 9/6267* (2013.01);
(Continued)

(58) Field of Classification Search
CPC ......... G06T 7/0002; G06T 2207/10016; G06T 2207/30232; G06K 9/6267; H04N 17/002
(Continued)

(56) References Cited

U.S. PATENT DOCUMENTS

| 2007/0236567 A1* | 10/2007 | Pillman | ................ | H04N 5/2351 348/143 |
| 2008/0192129 A1* | 8/2008 | Walker | ................... | G11B 27/34 348/231.2 |

(Continued)

*Primary Examiner* — Jefferey F Harold
*Assistant Examiner* — Omer Khalid
(74) *Attorney, Agent, or Firm* — Greenblum & Bernstein, P.L.C.

(57) ABSTRACT

Various embodiments are provided for evaluating a focus status of a camera. A reference image is stored in a memory based on first image data received from the camera. Second image data is received from the camera in accordance with a predetermined schedule. A focus status of a test image of the second image data is classified, and it is determined whether the camera is in a state of focus based on the focus status of the test image. A focus of the camera is changed when the camera is determined not to be in the state of focus. A new reference image is stored in the memory based on third image data received from the camera, with the third image data being received after changing the focus of the camera.

17 Claims, 14 Drawing Sheets

Related U.S. Application Data

(60) Provisional application No. 62/193,795, filed on Jul. 17, 2015.

(51) Int. Cl.
*G06K 9/62* (2006.01)
*G06K 9/20* (2006.01)

(52) U.S. Cl.
CPC ......... *G06K 9/6269* (2013.01); *H04N 17/002* (2013.01); *G06T 2207/10016* (2013.01); *G06T 2207/30168* (2013.01); *G06T 2207/30232* (2013.01)

(58) Field of Classification Search
USPC ........................................................ 348/143
See application file for complete search history.

(56) References Cited

U.S. PATENT DOCUMENTS

| | | |
|---|---|---|
| 2009/0167930 A1 | 7/2009 | Safaee-Rad et al. |
| 2014/0232860 A1* | 8/2014 | Martin ................... G03B 3/00 348/143 |
| 2016/0360090 A1 | 12/2016 | Kleyman et al. |

* cited by examiner

| No. | state | auto-focus | location |
|---|---|---|---|
| 1 | normal | yes | classroom A |
| 2 | alarm | yes | classroom B |
| 3 | alarm | no | warehouse A |
| 4 | warning | no | warehouse B |
| ... | | | |
| N | normal | yes | Entrance |

METHOD AND SYSTEM FOR AUTOMATED VIDEO IMAGE FOCUS CHANGE DETECTION AND CLASSIFICATION

CROSS-REFERENCE TO RELATED APPLICATION

This application is a continuation of U.S. patent application Ser. No. 15/211,378, filed on Jul. 15, 2016, which claims the benefit of U.S. Provisional Pat. Appl. No. 62/193,795 filed on Jul. 17, 2015. The disclosure of each of the above-identified applications, including the specification, drawings, and claims, is expressly incorporated herein by reference in its entirety.

BACKGROUND

1. Field of the Disclosure

The present disclosure relates to the field of images. More particularly, the present disclosure relates to detecting changes in a level of focus of images from a camera.

2. Background Information

The management of video and surveillance cameras can be burdensome, particularly when the number of cameras is large. Cameras in large systems may be used primarily for investigative purposes, for example, after the occurrence of an event of interest. That is, the cameras may not be under constant observation by human operators. Manual monitoring may be burdensome and prone to mistakes.

Thus, an unfortunate situation would arise when recorded images or video from a camera is retrieved, only to discover that the images do not contain sufficient detail due to certain factors.

The present application is directed to automatically detecting changes in the level of focus observed by the camera.

BRIEF DESCRIPTION OF THE DRAWINGS

FIG. 13 shows an exemplary table showing each camera status, according to an aspect of the present disclosure;

FIG. 16 shows an exemplary flowchart of processes in an alarm state, according to an aspect of the present disclosure; and.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are non-limiting illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
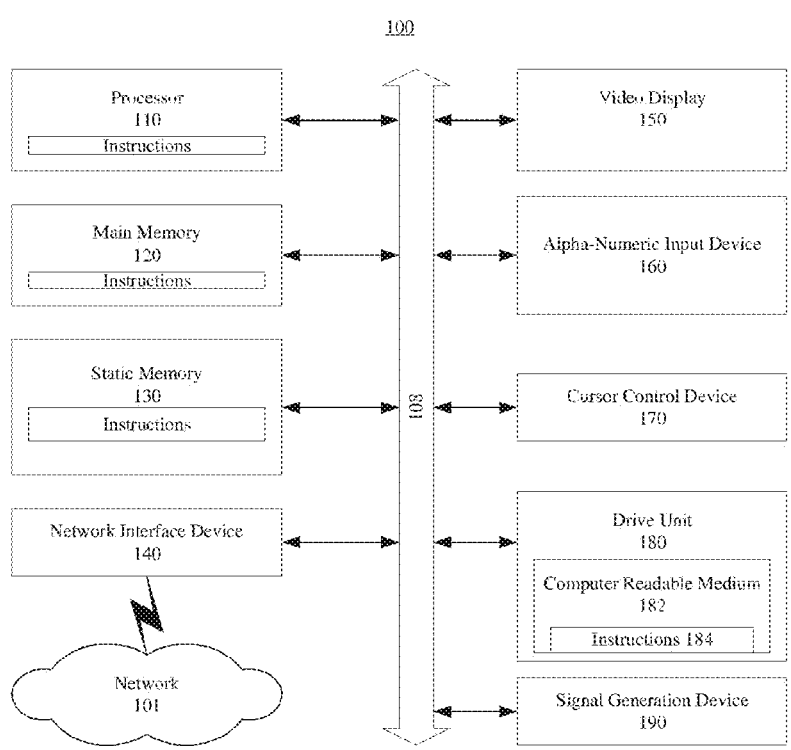
FIG. 1 shows an exemplary general computer system that includes a set of instructions for automatically detecting changes in the level of focus observed by the camera.

FIG. 1 is an illustrative embodiment of a general computer system, on which a method for automated video image focus change detection and classification can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems, server systems, storage systems, or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a server, a video server, a camera, bullet camera, dome camera, covert camera, discreet camera, infrared camera, night vision camera, power on Ethernet (PoE) camera, outdoor camera, day/night camera, varifocal camera, network camera, IP camera, wireless camera, PTZ camera, speed dome camera, high-definition camera, CCTV camera, a web appliance, a network router, switch or bridge, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

An aspect of the present disclosure is to monitor cameras to observe factors over time. Such factors include a degradation of focus, manipulation of the camera's line-of-sight, and occlusion of the optics resulting in blocking the camera's field of view.

For example, the cameras imaging sensor such as a CCD or CMOS may degrade over time, affecting the performance of the camera. In addition, the camera's line-of-sight may be intentionally manipulated by occurrences of vandalism and pranks, unintentionally by issues relating to the pan, tilt, zoom (PTZ) tracking. Further, the camera optics may be occluded by dust, animal droppings, soot, glare, and other foreign substances. Only the most significant changes to the camera's line-of-sight or field-of-view may be relatively easy to detect.

Two exemplary approaches to characterize and classify an image's level of focus are a reference image-based focus classification and a machine-learning based focus classification.

The focus of an image is measured, for example, by calculating the number of sharp edges that are detected within the image. As an image becomes defocused, the number of sharp edges decreases, thus the calculated metric indicates a diminished focus. A different scene may inherently have fewer edges due to a different number and/or shapes of objects in the scene. With that said, there is no known way to establish a set metric threshold, above which would indicate a focused image and below which would indicate a defocused image. The range of values for these metrics is dependent the content of the scene, the lighting, and the focus across the image.

As will be explained, reference image-based focus classification collects reference images associated with each camera. That is, the reference data is a set of actual images taken by the camera. The collected images are used to build a background image. For example, 100 images may be collected at increments of every two seconds; although, any desirable number of images may be used to build the background image and at any suitable interval. Having built the background image, a new image may be compared with the background image.

Using image segmentation, the new image is segmented into a series of (n×m) sub-images, each of which is evaluated separately for sharp edges, giving each sub-image its own classification. Then, a voting approach is used to determine how the entire image is classified. For example, if X (or greater) percent of the sub-images are classified as "out of focus", then the entire image is classified as "out of focus." Otherwise, the image is classified as "in focus." This prevents any one part of the image from dominating the classification, supporting the notion that when a camera's image is going out of focus, the entire image is going out of focus.

Figure 2:
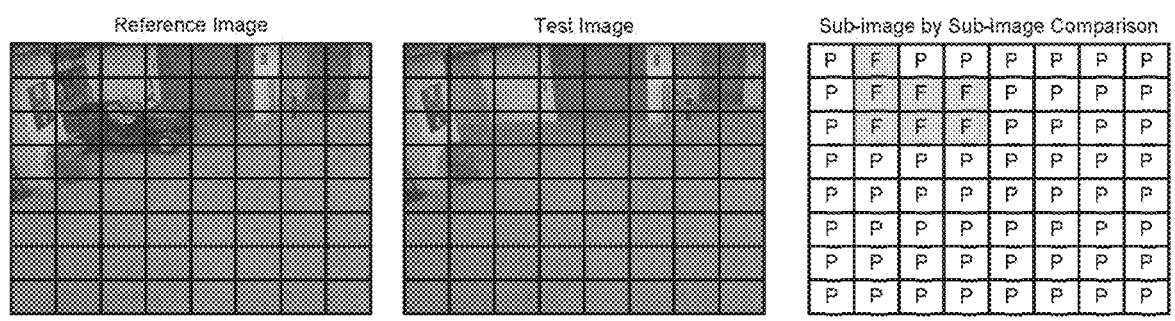
FIG. 2 shows an exemplary focus classification based on comparing sub-images between a reference image and a test image, according to an aspect of the present disclosure.

FIG. 2 is an exemplary focus classification based on comparing sub-images between a reference image and a test image. In FIG. 2, sub-images indicated with a "P" denote "pass" and sub-images indicated with an "F" denote "fail".

Figure 3:
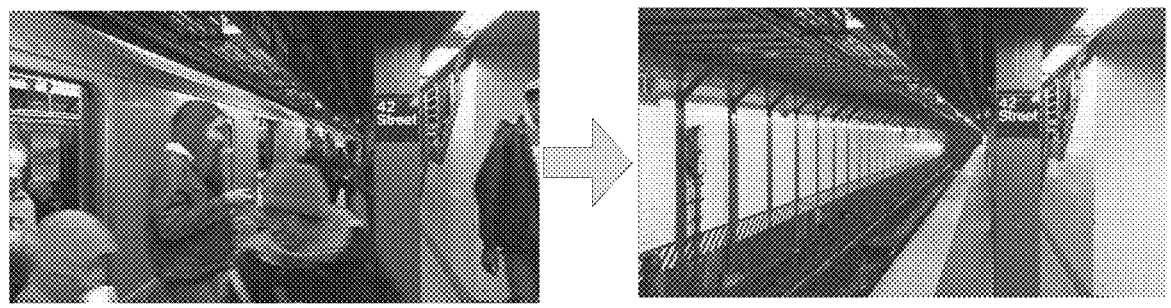
FIG. 3 shows an exemplary image of using background estimation to remove temporary objects in the scene of a video stream of a subway station, according to an aspect of the present disclosure.

FIG. 3 is an exemplary graphic of using background estimation to remove temporary objects in the scene of a video stream. In an embodiment, background estimation may be used to remove temporary objects in the scene of a video stream. In many scenarios, it is common for the content of a video image to change regularly. For example, if a video camera is capturing images of a pedestrian crosswalk, there will be people regularly moving into, across, and out of the field-of-view. This type of image content is temporary and is considered to be part of the image foreground. Conversely, the background content is considered to be that which is static or near static. Background estimating algorithms are used to perform motion tracking of foreground objects. For the purpose of motion tracking, the background is used to help identify the foreground objects and then track them in the image. For the purpose of image focus classification, the background provides a more consistent image for comparison and thus the basis for the focus calculations. This results in a more robust classification.

For the Machine Learning approach, the reference data is a training set of data that is defined by the particular classification technique used, and typically consists of metrics calculated from the image such as number or density of sharp edges or the distribution of light across the image.

Both the Reference Image and Machine Learning approaches base their classification on reference data, thus both can be considered reference-based approaches. For the Reference Image approach, the reference data is a set of actual images taken by the camera. For the Machine Learning approach, the reference data is a training set of data that is defined by the particular classification technique used, and typically consists of metrics calculated from the image such as number or density of sharp edges or the distribution of light across the image. For both techniques, the reference data is unique for each camera, and in fact, if a camera is re-pointed, the existing reference data is likely invalid and thus new reference data must be generated.

With no means for calculating a useful absolute measurement for focus, a relative approach may be employed where images of the same scene are compared against each other. If one possesses an image of known image quality, it is possible to compare a second image to it in terms of some calculated metric such as focus. A similar approach is by auto-focusing cameras where a series of images are taken, each with a different focus setting, resulting in the use of the focus setting associated with the image having the highest calculated focus metric. This approach assumes that the scene or lighting does not significantly change during the process of focusing the camera. For determining if a video camera's level of focus has decreased over time, this approach has to be adjusted to use an image that is established as the reference to which all others are compared, even if images are separated vastly in terms of time of image capture. The use of this type of reference image allows for the long-term monitoring of the "state" of the camera. This type of approach is herein referred to as a "Reference Image" approach.

Another approach would be to use one of several machine learning or statistical classification techniques. These techniques address the problem of identifying to which of a set of categories a new observation belongs. This is done on the basis of a "training set" of data containing observations whose category membership is known. For example, the training data for a focus-classifying system may consist of a set of data for in-focus images and a set of data for out-of-focus images. When a new image is received, the algorithm will classify the image as either "in-focus" or "out-of-focus" based upon how the characteristics of this new image compares to the data in the training set. This type of approach is herein referred to as a "Machine Learning" approach.

Figure 4:
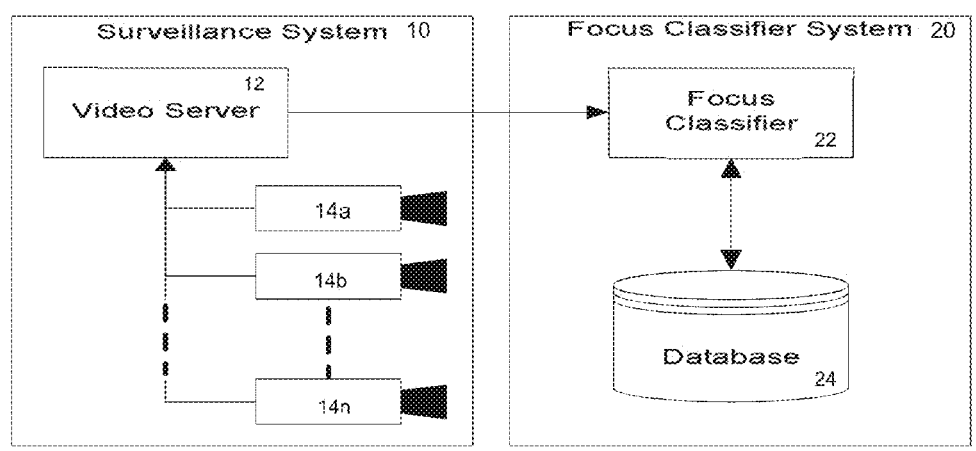
FIG. 4 shows an exemplary schematic of a video surveillance system with a focus classifier, according to an aspect of the present disclosure.

FIG. 4 shows an exemplary schematic of a video surveillance system 10 with a focus classifier 22, according to an aspect of the present disclosure. As shown, the video surveillance system 10 includes a video server 12 and one or more video cameras 14 (including 14a, 14b, . . . 14n). The video server 12 is configured to communicate with a focus classifier 22 that classifies the focus of images using one or both a reference image-based focus classification and a machine-learning based focus classification. The video server 12 includes a receiver for receiving images from video cameras 14 and a transmitter for transmitting images to the focus classifier 22. The focus classifier 22 has a database 24 which may be internal or external to the focus classifier 22. The focus classifier 22 includes a processor having a memory, a receiver for receiving images from the video server 12, and a transmitter for transmitting images to the database 24. The focus classifier 22 includes all of the necessary hardware, software, communication drivers, and interfaces to receive, classify, and transmit images. The video cameras 14 include a transmitter to transmit images to the video server 12.

Video transmission may be sent, for example, by streaming, progressive streaming, transport control protocol (TCP), user datagram protocol (UDP), real time transport protocol (RTP), real time transport control protocol (RTCP), real time messaging protocol (RTMP), real time streaming protocol (RTSP), hypertext transfer protocol (HTTP) live streaming, HTTP dynamic streaming, smooth streaming, dynamic streaming over HTTP (DASH), adaptive bitrate streaming, unicast protocol, multicast protocol, IP multicast, peer-to-peer protocol (P2P), and/or file transfer protocol (FTP), individual images, or a series of images, etc.

For both the Reference Image-based approach and the Machine Learning approach, the reference data is unique for each camera, and in fact, if a camera is re-pointed, the existing reference data is likely invalid and thus new reference data must be generated. In an embodiment, a determination as to whether to use the reference image-based approach or the machine learning approach may be made, for example, based on operator preference, time of day of video image capture, amount of detail in the background scene being monitored, a characteristic of the background scene being monitored, type of scene being monitored in the video image capture, frequency with which objects pass in front of the background of the image, etc.

In an embodiment, the system can select the Machine Learning approach for background scenes being monitored that contain a high degree of detail (e.g., city block) and select the Reference Image approach for background scenes being monitored that contain a lower level of detail (e.g., empty room, prison cell, etc.). Thus, the video server 12 may transmit a camera identifier to the focus classifier 22, indicating whether the Machine Learning approach or the Reference Image approach should be employed for the focus classification procedure.

Figure 5:
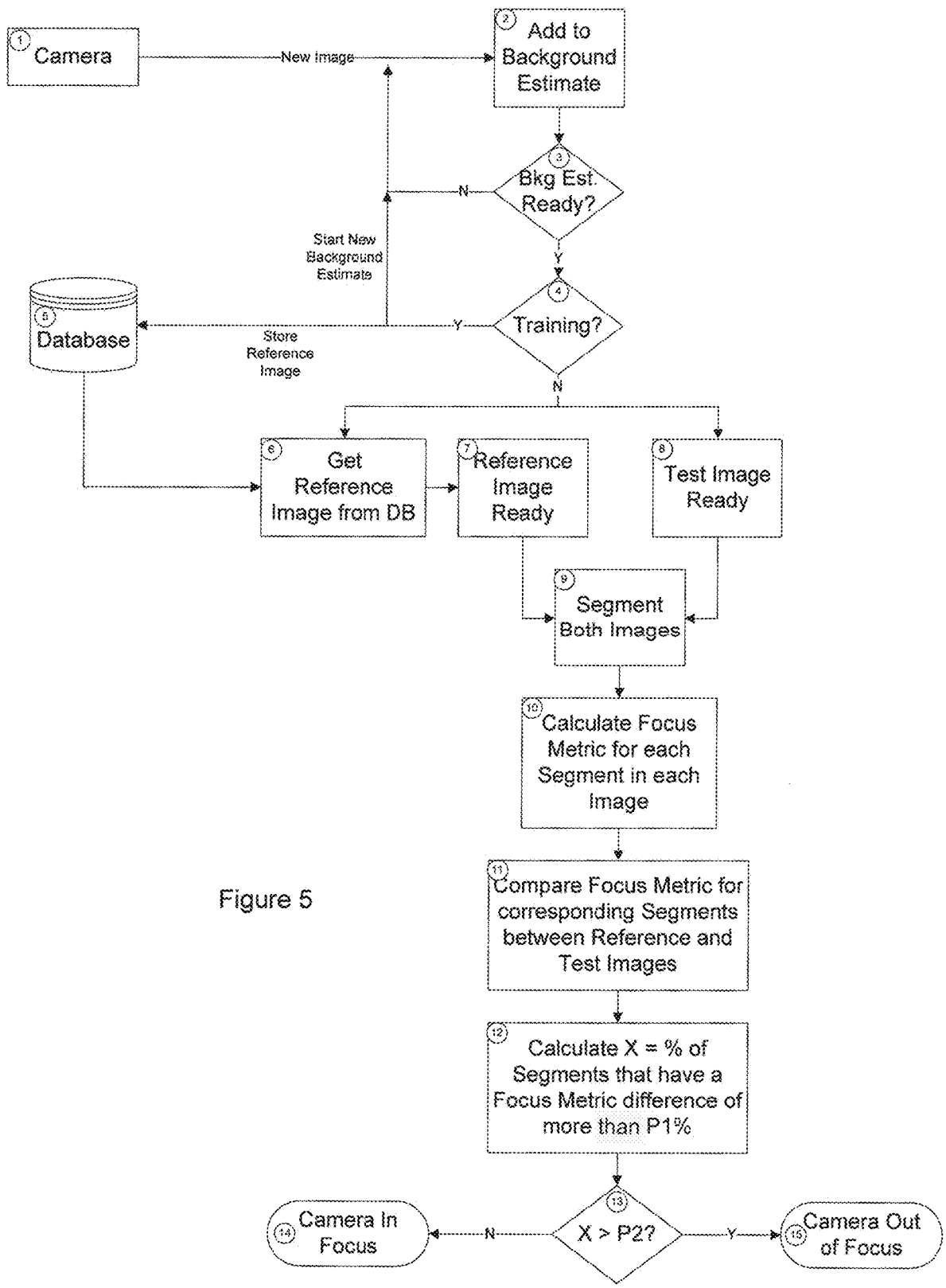
FIG. 5 shows an exemplary flowchart of a reference image-based focus classification algorithm, according to an aspect of the present disclosure.

FIG. 5 shows an exemplary flowchart of a reference image-based focus classification algorithm. At step 1, the video camera 14 provides stream of images to a classifier of the focus classifier 22. At step 2, a background estimator receives images from the camera at a predetermined rate and incrementally builds an estimate of the scene background. The number of images used to build the background and the time duration between each subsequent image are settable parameters in the estimation algorithm. The process of building a background estimate attempts to only include static elements of the image. Temporary objects in the image do not become part of the background estimate image. This is typically accomplished by building a statistical model of each pixel in an image, where the resulting value of each pixel in the background estimate is set to a value which is determined to be the predominate value through all the images used to build the estimate.

At step 3, once the prescribed number of images has been consumed by the background estimator, the new background estimate image is ready. If the prescribed number of images has not been reached, the algorithm will wait on the next image, returning to step 2. At step 4, once a new background estimate image is ready, it is decided whether this new image should be classified as a reference image, meaning the process is in the training mode, or if this new image will be set as the next test image. If in training mode, this new image is stored in the database 24 for later use, and then the flow returns to step 2 in order to begin building a new background estimate. If not in training mode, this image is set as the test image and the algorithm continues with the classification process. In one embodiment, a camera is typically put into training mode until it has captured a set of reference images which contains a sufficient representation of the lighting conditions experienced by the camera.

At step 5, a relational database is used to store the reference images. These images are used in the process of focus classification. At step 6, if not in training mode, once a new background image is ready, a reference image is selected from the images previously stored in the database 24. The selection can be based upon many different criteria, but is typically based upon a correlation of the distribution of light across the images. In other words, the reference image which has a distribution of light that is most similar to that of the test image is selected. At step 7, the reference image that is used is input to the classification algorithm. This was retrieved from the database 24. At step 8, the test image that is used is input to the classification algorithm. This image was the result of the last background estimate constructed in step 2.

At step 9, both the reference image and the test image are segmented into an array of m×n sub-images. The values of m and n are settable parameters of the algorithm. The values of m and n are settable by, for example, an operator or administrator, and may be modified as needed or desired. At step 10, a focus metric is calculated for each sub-image of the reference image and each sub-image of the Test Image. In order to calculate focus metrics for digital images, in one embodiment, the known Tenengrad technique is used, but a variety of other techniques could also be used. At step 11, a comparison of the focus metrics between the reference and the test image for corresponding sub-images is performed. For example, the system compares the calculated focus metric for reference sub-images from row 1, column 1 with the calculated focus metric for the test sub-image from row 1, column 1. Then, the system finds the percent difference in the focus metric between the reference image and the test image. This procedure is repeated for each sub-image. The result should be an m×n array of values, where each value represents the percent difference between the reference sub-images and the test sub-images. At step 12, a calculation of the percent of sub-images that have a change of greater than P1%, where P1 is a settable parameter in the algorithm, is made. The idea here is to determine how many of the sub-images have substantially changed in terms of focus. In other words, how much of the image is considered to be out of focus.

At step 13, if the percent of the image considered out of focus is greater than P2, then the camera is considered to be out of focus. P2 is a settable parameter in the classification algorithm. At step 14, the camera is classified as in focus. At step 15, the camera is classified as out of focus.

Figure 6:
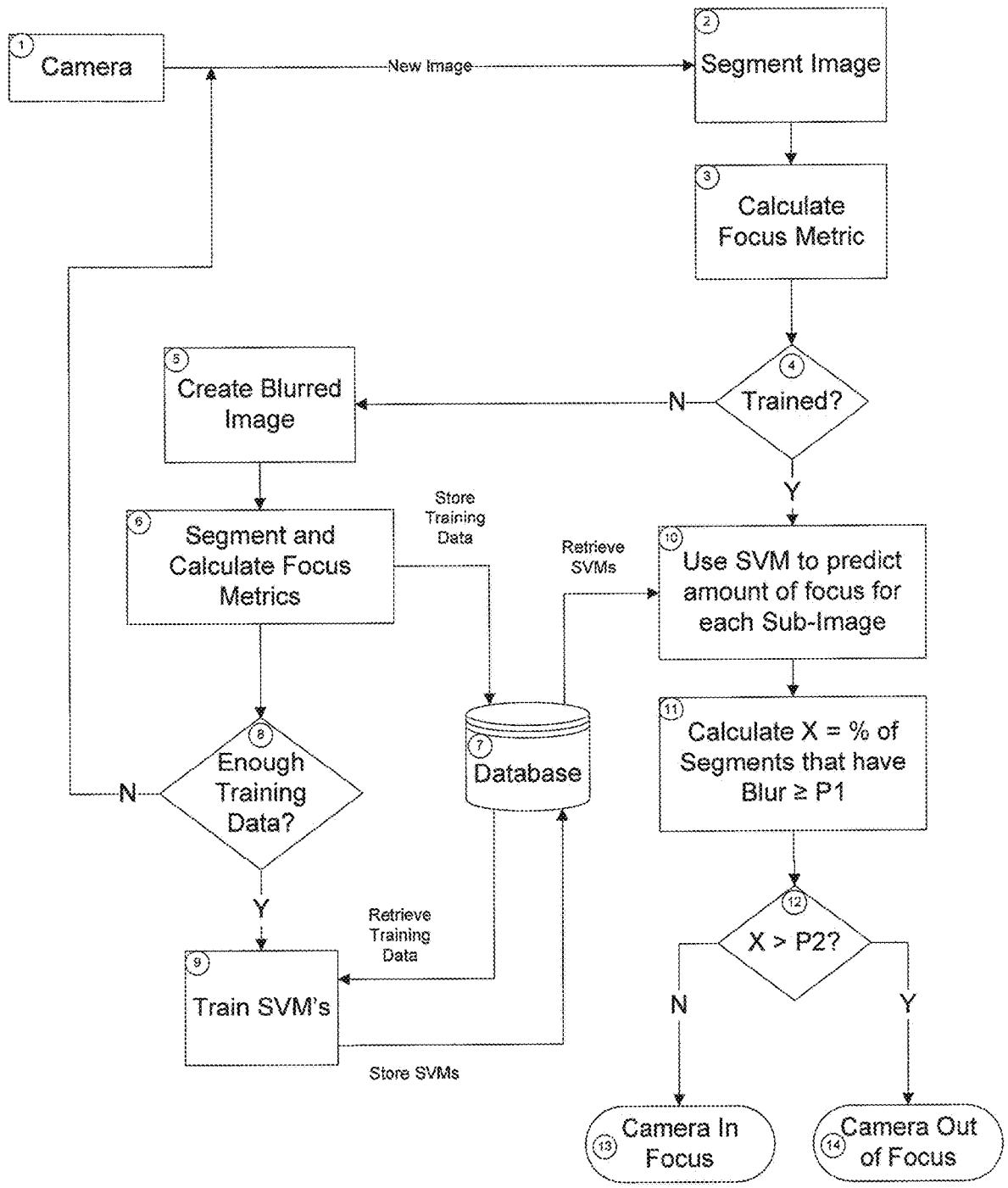
FIG. 6 shows an exemplary flowchart of a machine learning-based focus classification algorithm, according to an aspect of the present disclosure.

FIG. 6 shows an exemplary flowchart of a machine learning-based focus classification algorithm. At step 1, the video camera 14 provides stream of images to Classification Algorithm of the focus classifier 22. At step 2, the new image is segmented into an array of m×n sub-images. The values of m and n are settable parameters of the algorithm. At step 3, several metrics relevant to focus determination are calculated for each sub-image of the incoming new image.

There are many techniques used to calculate focus metrics for digital images. In one embodiment, the known Tenengrad technique is used here along with edge density and luminosity, but a variety of other techniques could also be used.

At step 4, if the support vector machines have been trained and tuned to the data, the new image is ready to be classified based on the focus metrics. Otherwise, the data needs to be stored away until there is enough to train. At step 5, in order for the support vector machines to predict image focus, they need a basis for comparison. The new image is considered in-focus, and a gaussian blur, for example, is applied to the new image to create a separate blurred image that approximates what the image might look like were the camera out of focus. The amount of blur applied is random within a settable range. At step 6, the blurred Image undergoes the same segmentation and evaluation as described in steps (2) and (3) in order to estimate how the focus metrics might change for out-of-focus images.

At step 7, a database 24, such as a relational database, is used to store the training data from both the new image and the blurred image. The images themselves are not stored in the database 24—once the focus metrics have been calculated, both images are deleted or destroyed. At step 8, the Classification algorithm requires data from a number of images from each hour of the day. The number of images is a settable parameter of the algorithm and certain hours can be ignored if need be, but it's important that training data is gathered over at least a 24-hour period so that the classifier is prepared for many different scenarios with varying lighting conditions and foreground activity.

At step 9, if enough data has been collected, a support vector machine (SVM) is created and trained for each of the m×n sub-images using known techniques. Because of the relatively small training set and flexibility offered by classifying multiple sub-images, the support vector machines are typically not individually optimized, but they do use settable parameters of the algorithm. The completed support vector machines are stored in a relational database. At step 10, once the support vector machines have been trained, they can be used to predict the amount of blur in the image based on the focus metrics and their similarities to the training data. For example, a certain focus metric of the image may be high for the untouched, in-focus images, but fall drastically when the gaussian blur is applied during training. If given an image with a low value for that feature, the support vector machines will tend to predict higher amounts of blur.

At step 11, for each sub-image, a comparison of the predicted blur to P1 is made, where P1 is a settable parameter in the algorithm that represents an acceptable amount of blur in the image. If the predicted blur is less than P1, then this sub-image is considered to be in-focus. Otherwise, it is considered out of focus. Then, a calculation of the percent of sub-images that have a predicted blur greater than or equal to P1 is made. This resulting percentage represents the confidence of the algorithm that the whole image is out of focus. At step 12, if the percent of the image considered out of focus is greater than P2, then the camera is considered to be out of focus. P2 is a settable parameter in the classification algorithm. At step 13, the camera is classified as in focus. At step 14, the camera is classified as out of focus.

Figure 7:
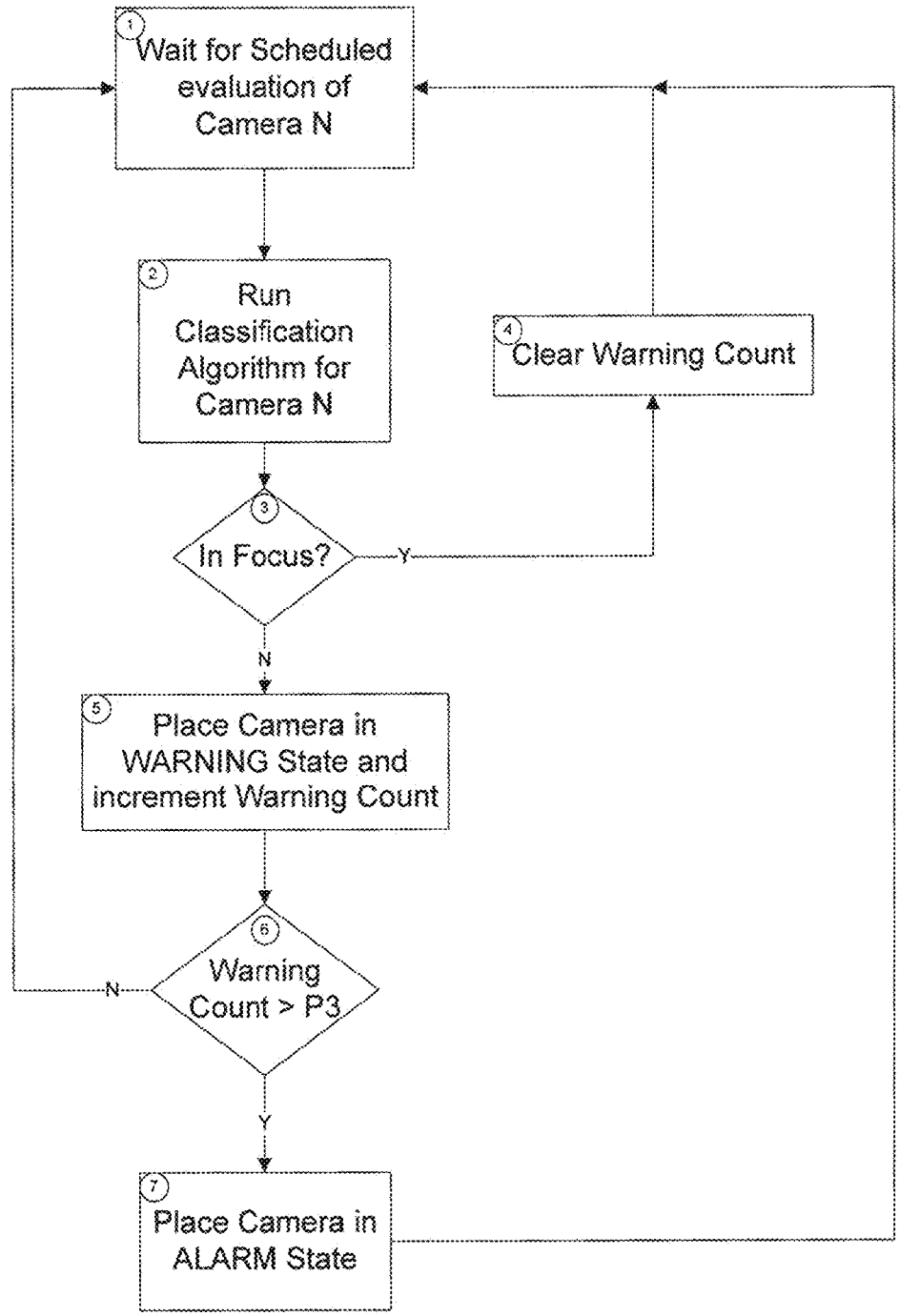
FIG. 7 shows an exemplary flowchart of a camera monitoring process, which applies to both the Reference Image-Based Classification Algorithm and the Machine Learning-Based Classification Algorithm, according to an aspect of the present disclosure.

FIG. 7 shows an exemplary flowchart of a camera monitoring process, which applies to both the Reference Image-Based Classification Algorithm and the Machine Learning-Based Classification Algorithm. It is understood that multiple cameras may be monitored simultaneously and/or sequentially.

At step 1, video cameras 14 are evaluated for focus using a predetermined schedule or by using an automated scheduling algorithm. Either scheduling technique is based upon known technology. At step 2, a focus classification algorithm is run for the selected camera in order to determine if the camera is in focus. Either the Reference Image-Based or the Machine Learning-Based algorithm could be run, or optionally both. Alternatively, a weighted average of the Reference Image-Based and the Machine Learning-Based techniques may be used. At step 3, a response to the results of the focus classification algorithm is sent.

At step 4, if the camera is "in focus", then clear the Warning Count and return to step 1. At step 5,—If the camera is "out of focus", then place the camera in a WARNING State and increment the Warning Count.

At step 6, the system responds to the new value of the Warning Count. If the Warning Count is less than P3, then return to step 1. P3 is a settable parameter. At step 7, if the Warning Count is greater than P3, then the camera is placed in an ALARM State and return to step 1. P3 is a settable parameter which defines how long the camera can be in a WARNING State before an ALARM State is set.

Figure 8:
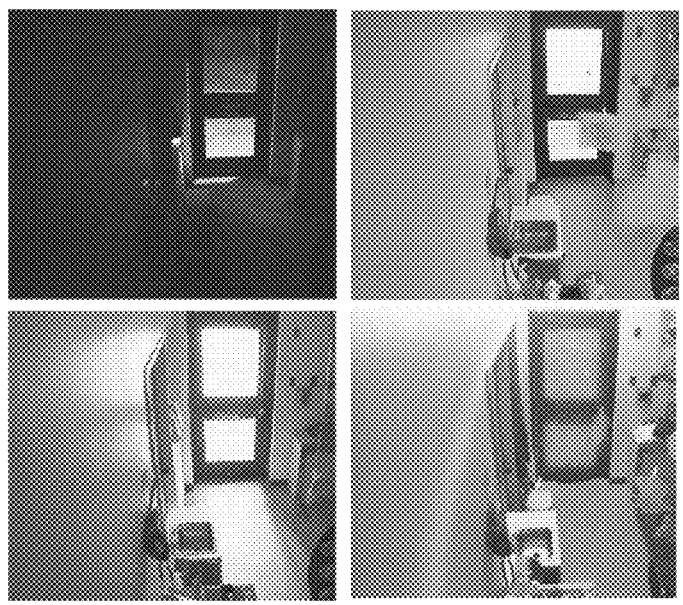
FIG. 8 shows an exemplary image of variation in lighting conditions experienced by a camera, according to an aspect of the present disclosure.

FIG. 8 is an exemplary graphic showing variation in lighting conditions experienced by a camera. Over the course of a day, many video scenes experience changes in the lighting conditions. This may be caused by natural changes in light levels due to movement of the sun and clouds, by the normal cycling of indoor and outdoor lights, or by some combination these and other factors. Regardless, the lighting conditions in a video scene typically change throughout the course of a day. With that in mind, reference data used for any classification approach described herein includes data from the various lighting conditions typical of the video scene.

Figure 9:
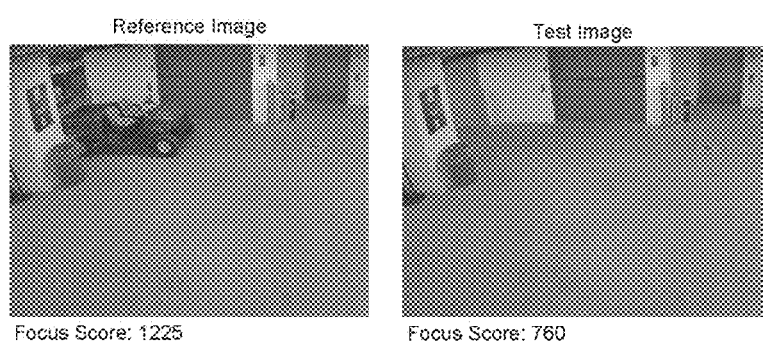
FIG. 9 shows an exemplary focus score degradation due to localized change in image content, according to an aspect of the present disclosure.

FIG. 9 is an exemplary graphic showing focus score degradation due to localized change in image content. Several challenges arise as a reference-based strategy is implemented and used. For example, for an image with most of its sharp edges clustered in a small area, any small change to that area of the image could cause an incorrect classification. That is, small areas of the image can dominate the classification calculation.

Figure 10:
FIG. 10 shows an exemplary image with significant temporary content, according to an aspect of the present disclosure.

FIG. 10 is an exemplary graphic showing an image with significant temporary content. Additionally, temporary foreground objects in a scene could cause an incorrect classification. For example, for an image with relatively few sharp edges, if an object temporarily moves into or out of the field-of-view, it can have such a strong effect on the value of any calculated metric that it could erroneously indicate a significant change in the overall focus of the image. Also, variation in lighting could significantly change the level of focus of an image.

Figure 11:
FIG. 11 shows an exemplary image of effects of lighting on image content, according to an aspect of the present disclosure.

FIG. 11 is an exemplary graphic showing effects of lighting on image content. As objects come into or out of shadow, edges appear or disappear and thus focus calculations may change drastically. The present method and system advantageously overcomes the noted challenges.

Figure 12:
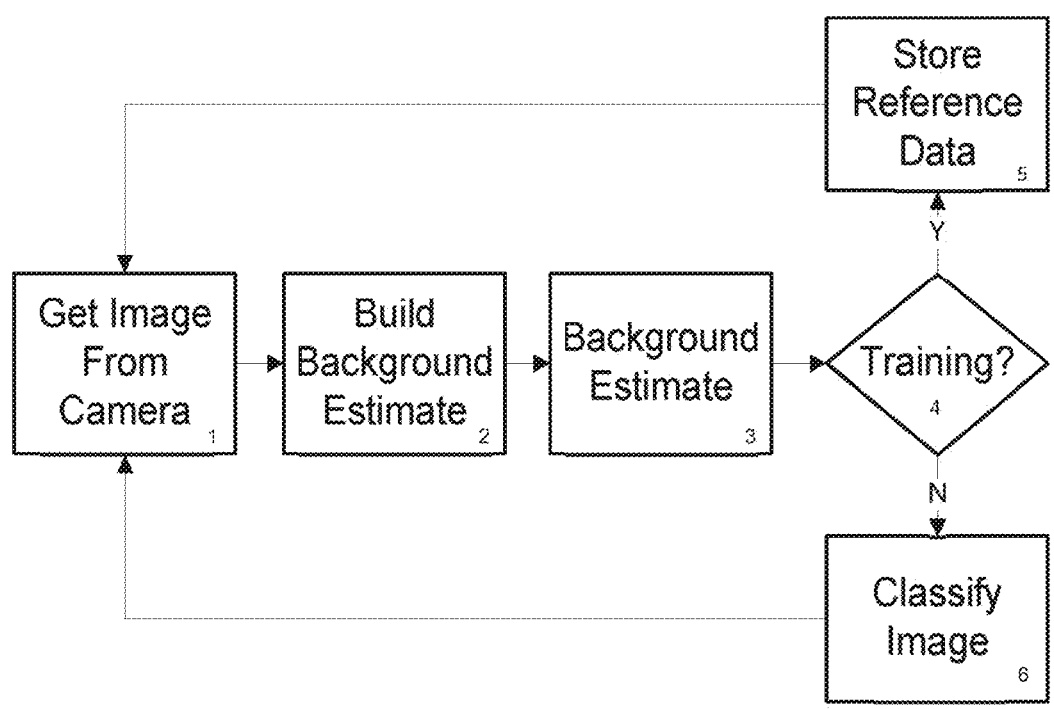
FIG. 12 shows an exemplary process for using background estimates in focus classification, according to an aspect of the present disclosure.

FIG. 12 is an exemplary process for using background estimates for focus classification, as detailed in FIG. 5. That is, at step 1, an image is received from a camera at the focus classifier 22. Then, at step 2, the background estimator, which is optionally part of the focus classifier 22 processor, receives the images and incrementally builds an estimate of the background scene at step 3. Once the prescribed number of images, a modifiable setting set by a user or administrator, has been received and processed by the background estimator, the background estimate is ready. Then, for a new image, if in training mode (step 4=yes), the new image is stored in the database 24 at step 5. If not in training mode (step 4=no), the new image is set as the test image and the algorithm continues with the focus classification process at step 6.

FIG. 13 is an exemplary table showing each camera status according to an aspect of the present disclosure. The table shown in FIG. 13 is stored in a memory of the video server 12. The camera server 12 updates each camera status in the table when a change of camera status is detected.

Figure 14:
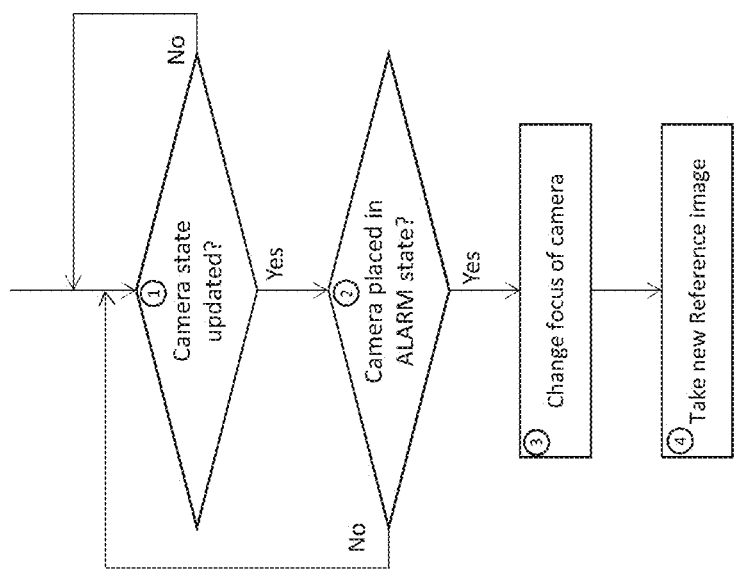
FIG. 14 shows an exemplary flowchart of processes in an alarm state, according to an aspect of the present disclosure.

FIG. 14 is an exemplary flowchart of an alarm state process according to an aspect of the present disclosure. At step 1, one or more camera states of the video camera 14 (i.e., 14*a*, 14*b*, and/or 14*n*) are determined as to whether the one or more video cameras 14 are in an ALARM state when at least one of the camera states is updated or when a predetermined time elapses. For instance, the video server 12 may check each camera state stored in the memory of the video server 12 to make the determination. If one of the video cameras 14 is determined to be in an ALARM state (e.g. at the step 7 of the FIG. 7), the flow moves forward to the next step.

At step 2, the video camera 14 in the ALARM state changes a focus of the camera in accordance with a predetermined method in response to instructions to the video server 12 or instructions from a user. The video camera 14 may also start to change the focus of the camera automatically without any instructions from another device when detecting the state of out-of-focus. The predetermined method, for example, corresponds to an autofocus procedure. The video camera 14 having a function of autofocus (e.g. No. 2 in the table shown in FIG. 13) may perform autofocus processes to change the focus of the camera. Consequently, the video camera 14 could correct the state of out-of-focus and return to a state of in-focus. The video camera 14 not having the function of autofocus (e.g. No. 3 in the table shown in FIG. 13) may use a different procedure from the autofocus procedure or change the focus of the camera in accordance with preset parameters or user inputs.

At step 3, the video camera 14 takes a new reference image after changing the focus of the camera. The new reference image associated with the video camera 14 which changed the focus of the camera is transmitted to the database 24 to be stored. An old reference image may be replaced from the new reference image in the database 22. Alternatively, both the old reference image and the new reference image may be stored in the database 22.

Figure 15:
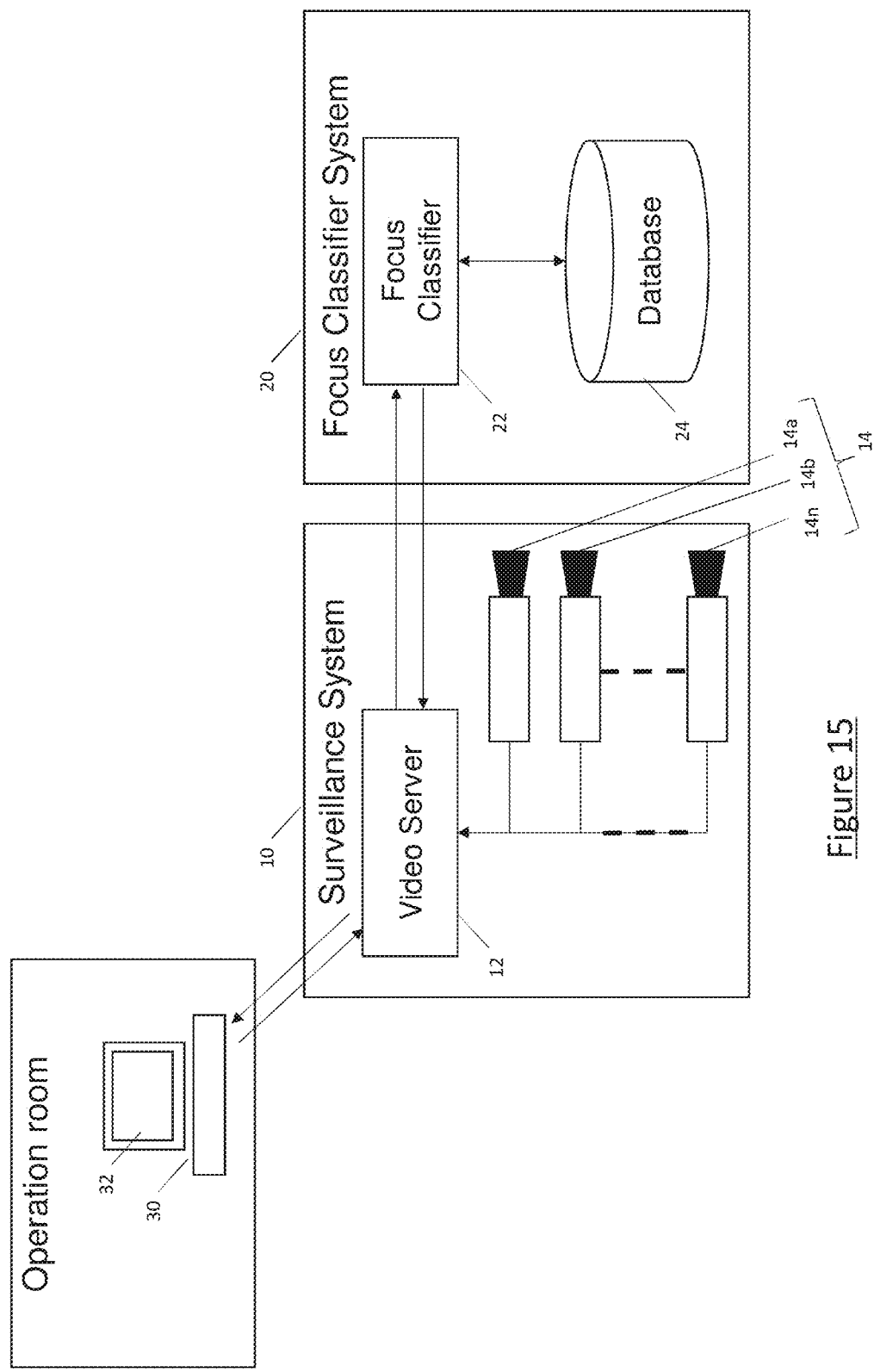
FIG. 15 an exemplary schematic of a video surveillance system with a focus classifier, according to an aspect of the present disclosure.

FIG. 15 is an exemplary schematic of a video surveillance system with a focus classifier, according to an aspect of the present disclosure. FIG. 15 further shows a computer 30 having a processor and communications hardware and software located in an operation room, in addition to the video surveillance system 10 and the focus classifier system 20. The computer 30 is coupled to the video server 12 of the video surveillance system 10 via a network.

The computer 30 is configured to communicate with the video server 24 discussed above. The computer 30 includes a receiver for receiving images from video server 12 and a transmitter for transmitting instructions for controlling the video server 12 and/or video camera 14. The computer 30 includes a monitor display 32 that displays the images received from the video server 12. The computer 30 could receive any instructions with respect to the video camera which captured the displayed image on the monitor display from a user via an input device (such as the input 160 described above).

Video transmission between the video server 12 and the computer 30 may be sent, for example, by streaming, progressive streaming, transport control protocol (TCP), user datagram protocol (UDP), real time transport protocol (RTP), real time transport control protocol (RTCP), real time messaging protocol (RTMP), real time streaming protocol (RTSP), hypertext transfer protocol (HTTP) live streaming, HTTP dynamic streaming, smooth streaming, dynamic streaming over HTTP (DASH), adaptive bitrate streaming, unicast protocol, multicast protocol, IP multicast, peer-to-peer protocol (P2P), and/or file transfer protocol (FTP), individual images, or a series of images, etc.

Figure 16:
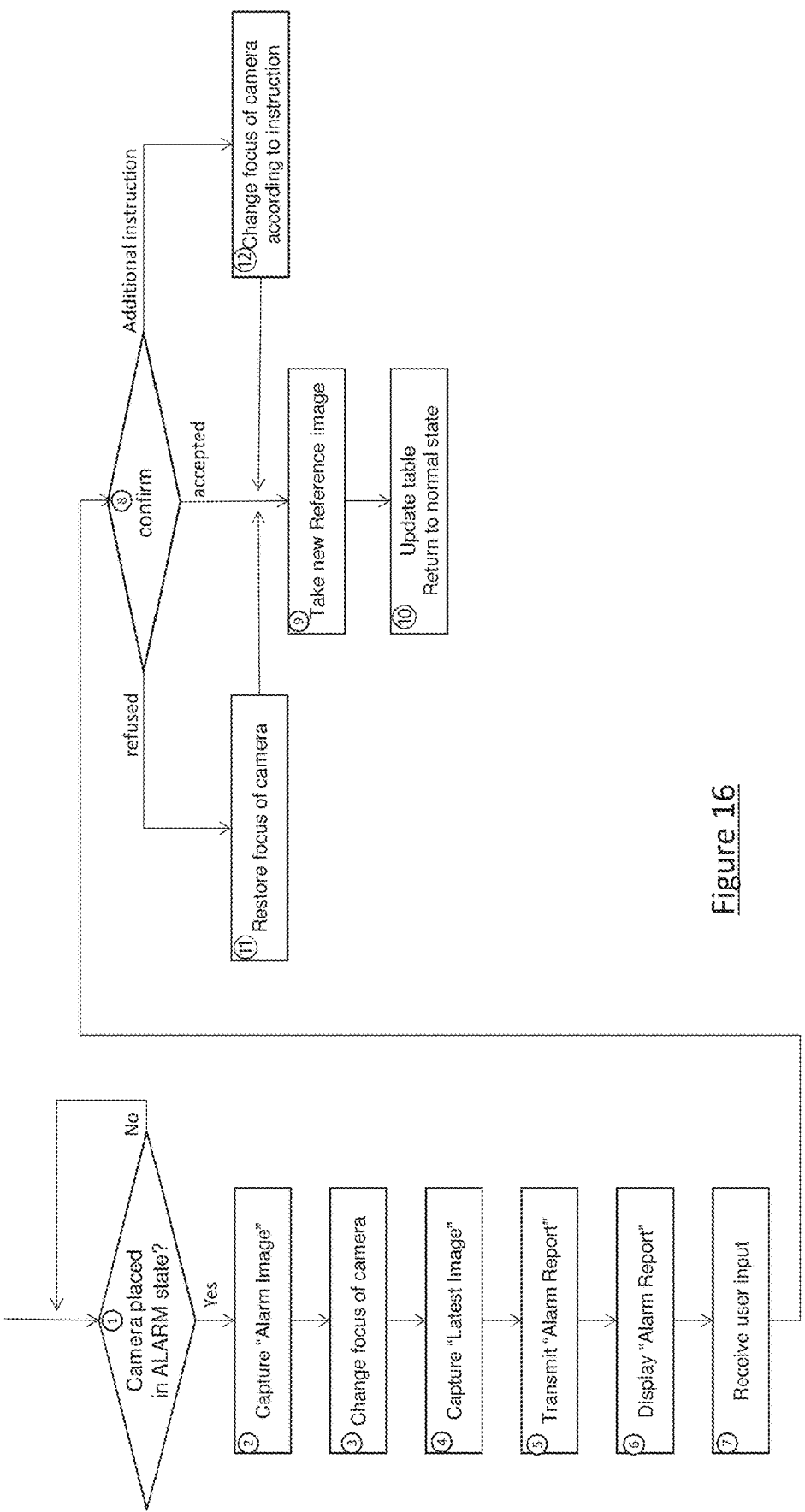

FIG. 16 is an exemplary flowchart of processes in an alarm state according to an aspect of the present disclosure. At step 1, one or more camera states of the video camera 14 are determined as to whether the one or more video cameras 14 are in the ALARM state when at least one of the camera states is updated or a when predetermined time elapses. For instance, the video server 12 may check each camera state stored in the memory of the video server 12 to confirm. If one of the video cameras 14 is determined as the ALARM state (e.g. at the step 7 of the FIG. 7), the flow moves forward to the next step.

At step 2, the video camera 14 in the ALARM state captures a new image as an "Alarm Image". The video camera 14 in the ALARM state may also take a short video as an "Alarm Video". In an embodiment, the Alarm Image (and/or the Alarm Video) indicates an image (or video) took during the state of out-of-focus. The Alarm Image (and/or the Alarm Video) are stored in a memory of the video server 12.

At step 3, the video camera 14 in the ALARM state change a focus of the camera in accordance with a predetermined method in response to instructions from the video server 12 or instructions from a user. The video camera 14 may also start to change the focus of the camera automatically without any instructions from another device when detecting the state of out-of-focus. The predetermined method, for example, corresponds to an autofocus procedure. The video camera 14 having a function of autofocus (e.g. No. 2 in the table shown in FIG. 13) may perform an autofocus process to change the focus of the camera. Consequently, the video camera 14 could correct the state of out-of-focus and return the camera to a state of in-focus. The video camera 14 not having the function of autofocus (e.g. No. 3 in the table shown in FIG. 13) may use a different procedure from the autofocus procedure or change the focus of the camera in accordance with preset parameters or user inputs.

At step 4, the video camera 14 that changed the focus of the camera captures a new image as a "Latest Image". The video camera 14 that changed the focus of the camera may also take a new video as a "Latest Video". The Latest Image (or the Latest Video) indicates an image (or video) taken after changing the focus of the camera. The Latest Image (and/or the Latest Video) are stored in a memory of the video server 12.

Figure 17:
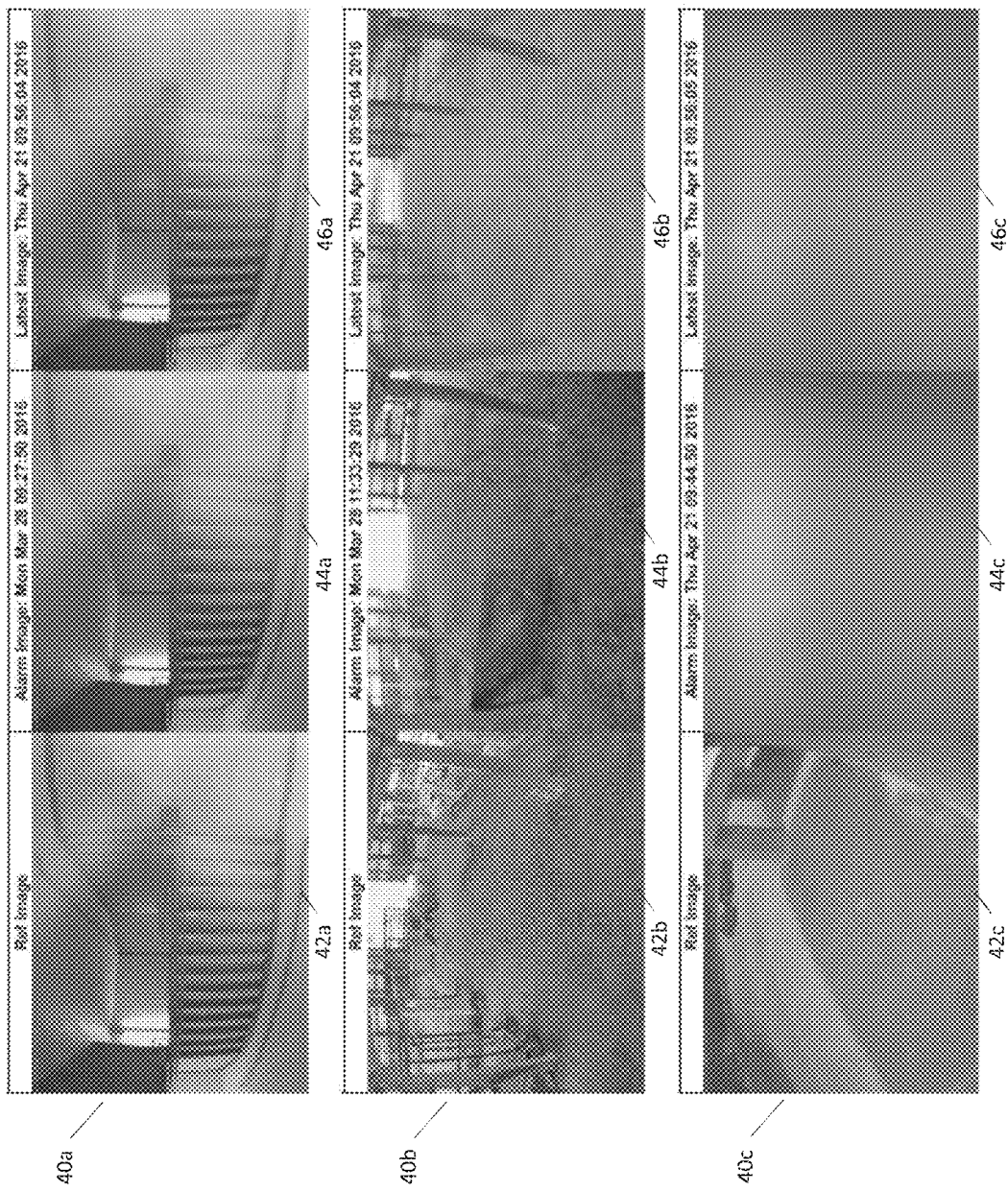
FIG. 17 shows an exemplary alarm report, according to an aspect of the present disclosure.

At step 5, an "Alarm Report" is generated and transmitted to the computer 30 (e.g. by the video server 12, the video camera 14, the focus classifier 22 or the database 24). At the step 6, the Alarm Report is displayed on the monitor display 32. FIG. 17 is an exemplary alarm reports according to an aspect of the present disclosure. FIG. 17 shows Alarm Reports 40*a*-40*c*. Each of the Alarm Report includes the Reference Image stored in the database 24, the Alarm Image captured by the video camera 14 at step 2 and the Latest Image captured by the video camera 14 at step 4.

At step 7, the computer 30 receives a response (e.g. acceptance, refusal, or additional instruction) with respect to the Alarm Reports from a user. At step 8, contents of the response from a user are confirmed. If the computer 30 receives an acceptance as the response with respect to the Latest Image, which is displayed on the monitor display 32 as the Alarm Report, from a user via the input device at step 7, the flow moves forward to step 9. That is, the user acknowledges that the video camera 14 takes better pictures (or videos) rather than maintaining the focus of the camera. The acceptance may also be transferred to the video server 14 or the focus classifier 22 from the computer 30.

At step 9, the video camera 14 takes a new reference image since the focus of the camera is changed. Before taking the new reference image, the video camera 14 may detect, identify, or track foreground objects (e.g. persons) to wait for foreground objects to disappear from images taken by the video camera 14. Then after the foreground objects are gone, the video camera 14 takes the new reference image. During identifying, identifying or tracking the foreground objects, some or all of steps in FIG. 7 may not be processed. In other words, the camera monitoring processes in FIG. 7 may be performed after taking the new reference image in a state having no foreground objects, which is stored in the database 24. Thereby, a further ALARM state of the video camera 14 is not detected unless the new reference image is replaced.

In another case, the flow moves forward to step 11 if the computer 30 receives a refusal as the response with respect to the Latest Image, which is displayed on the monitor display 32 as the Alarm Report, from a user via the input device at step 7. At step 11, the video camera 14 restores the focus of the camera before changing the focus of the camera since the user preferred the Alarm Image to the Latest Image. Thus, parameters for focus which are used before changing at step 3 are stored for in a memory of the video camera 14, the video server 12, the focus classifier 22 or the database 24, even after changing them, in order to restore them in later for such a case. Accordingly, those parameters for focus are reset to the video camera 14 at step 11. Then, the flow moves to steps 9 and 10.

In another case, the flow moves forward to step 12 if the computer 30 receives an additional instruction as the response with respect to the focus of video camera 14 from a user via the input device at step 7. Then at step 12, the video camera 14 changes the focus of the camera in accordance with additional instructions. For example, an additional instruction includes parameters for focus and the parameters are set to the video camera 14. Then, the flow moves to steps 9 and 10.

In an embodiment, the exemplary camera discussed herein includes an imager, an encoder, a controller, a radio communicator, a user interface (UI), and a storage. The imager includes an imaging optical system, an imaging element, and a signal processing circuit etc. The imager converts an optical image of an imaging subject having passed through the imaging optical system into signals. The imaging optical system of the imager is movable. The camera calculates a distance to an imaging subject in focus, based on the position of the imaging optical system. The encoder generates image data by encoding signals obtained by image capturing by the imager. Specifically, the encoder generates a moving-image data by using signals which are continuously input from the imager. The imager and the encoder form an image generator.

The controller controls operations of the imager, the encoder, the radio communicator, the UI, and the storage of the camera. The controller controls the above components by following instructions from the UI, and a control command received by the radio communicator. In the present embodiment, the controller controls the wireless camera, in accordance with the control command, to transform an image data transmitted from the radio communicator from a moving-image data into a still-image data, or to issue a warning. The control command may be a command for changing the resolution in the imager, the frame rate in the encoder, and the parameter of image data contained in transmission data in the radio communicator.

Accordingly method and system for automated video image focus change detection and classification advantageously enables an improved method and system for focus change detection and classification. The method and system can thus detect changes resulting from degradation of focus, manipulation of the camera's line of sight, and/or occlusion of optics. Advantageously, the system provides effective solutions for fast processing of video image focus change detection and classification and flexibility in processing the video image focus change detection and classification according to employing one or both of the reference image and machine learning approaches, for example, without operator input. Thus, a reduction in operational/input load on the part the processor is achieved.

Thus, historic reference data may be used as a basis for focus classification for each camera; background estimation may be used as a basis for focus classification; image segmentation may be used with a voting strategy; and/or machine learning or statistical classification techniques may be used along with historical reference data to perform focus classification for each camera.

Although a method and system for automated video image focus change detection and classification has been described with reference to several exemplary embodiments, it is understood that the words that have been used are words of description and illustration, rather than words of limitation. Changes may be made within the purview of the appended claims, as presently stated and as amended, without departing from the scope and spirit of a method and system for automated video image focus change detection and classification in its aspects. Although a method and system for automated video image focus change detection and classification has been described with reference to particular means, materials and embodiments, a method and system for automated video image focus change detection and classification is not intended to be limited to the particulars disclosed; rather a method and system for automated video image focus change detection and classification extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards such as (IP, CCTV, PTZ, TCP, UDP, RTP, RTCP, RTMP, RTSP, HTTP, DASH, P2P, FTP) represent examples of the state of the art. Such standards are periodically superseded by re efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

According to an aspect of the present disclosure, a system is provided for evaluating a focus status of a video camera. The system includes a processor and a memory that stores instructions. When executed by the processor, the instructions cause the processor to perform operations including receiving at a receiver a video image from a video server in accordance with a predetermined schedule, determining a focus classification procedure to perform on the received video image, classifying the focus status of the video image in accordance with the focus classification procedure and determining from the video image whether the video camera is in a state of focus, and clearing a warning count when the video image is determined to be in a state of focus and setting an alarm indication when the warning count exceeds a predetermined threshold.

According to another aspect of the present disclosure the operations further include incrementing the warning count a first time when the video image is determined to be in a state of non-focus as a result of a first determination, and setting a warning status when the warning count is incremented.

According to another aspect of the present disclosure, the operations further include clearing the incremented count when the video image is determined to be in a state of focus as a result of a second determination.

According to another aspect of the present disclosure the operations further include incrementing the warning count a second time when the video image is determined to be in a state of focus as a result of a second determination, and setting the alarm indication when the warning count, incremented a second time, exceeds the predetermined threshold of at least two.

According to another aspect of the present disclosure, the operations further include selecting one or more distinct focus classification procedures, and classifying the focus status of an image of the video camera in accordance with the selected focus classification procedure.

According to another aspect of the present disclosure, the focus classification procedure incrementally building an estimate of a background of a scene, storing a reference image based on the estimate, retrieving the reference image, segmenting each of the video image and the reference image into a respective array of sub-images, calculating a focus metric for each sub-image of the video image and the reference image, comparing focus metrics between the sub-images of the video image and the sub-images of the reference image, calculating a percent of sub-images that have a focus metric difference of greater than a first parameter, and determining whether the video camera is in a state of focus based on whether a percent of the image that is out of focus is greater than a second parameter.

According to another aspect of the present disclosure the focus classification procedure includes segmenting the video image into an array of sub-images, calculating at least one metric associated with a focus determination for each sub-image, applying a blur to the video image to create a blurred image approximating what the video image may look like if the video camera were in an out of focus state, segmenting the blurred image in order to estimate how the at least one metric may change for an out of focused image, storing the video image and the blurred image; predicting an amount of blur for each sub-image, comparing the predicted amount of blur an acceptable amount of blur in the video image, calculating a percent of sub-images that have a predicted blur greater than or equal to a first parameter, the percent representing a confidence that a whole of the video image is out of focus, and determining whether the video camera is in a state of focus based on whether the percent of the video image considered out of focus is greater than a second parameter.

According to an aspect of the present disclosure, a method is provided for evaluating a focus status of a video camera. The method includes receiving at a receiver a video image from a video server in accordance with a predetermined schedule, determining a focus classification procedure to perform on the received video image, classifying the focus status of the video image in accordance with the focus classification procedure and determining from the video image whether the video camera is in a state of focus, and clearing a warning count when the video image is determined to be in a state of focus and setting an alarm indication when the warning count exceeds a predetermined threshold.

According to another aspect of the present disclosure, the operations further include incrementing the warning count a first time when the video image is determined to be in a state of non-focus as a result of a first determination, and setting a warning status when the warning count is incremented.

According to another aspect of the present disclosure, the operations further include clearing the incremented count when the video image is determined to be in a state of focus as a result of a second determination.

According to another aspect of the present disclosure, the operations further include incrementing the warning count a second time when the video image is determined to be in a state of focus as a result of a second determination, and setting the alarm indication when the warning count, incremented a second time, exceeds the predetermined threshold of at least two.

According to another aspect of the present disclosure, the operations further include selecting one or more of focus distinct classification, and classifying the focus status of an image of the video camera in accordance with the selected focus classification procedure.

According to another aspect of the present disclosure, the focus classification procedure includes incrementally building an estimate of a background of a scene, storing a reference image based on the estimate, retrieving the reference image, segmenting each of the video image and the reference image into a respective array of sub-images, calculating a focus metric for each sub-image of the video image and the reference image, comparing focus metrics between the sub-images of the video image and the sub-images of the reference image, calculating a percent of sub-images that have a focus metric difference of greater than a first parameter, and determining whether the video camera is in a state of focus based on whether a percent of the image that is out of focus is greater than a second parameter.

According to another aspect of the present disclosure, the focus classification procedure includes segmenting the video image into an array of sub-images, calculating at least one metric associated with a focus determination for each sub-image, applying a blur to the video image to create a blurred image approximating what the video image may look like if the video camera were in an out of focus state, segmenting the blurred image in order to estimate how the at least one metric may change for an out of focused image, storing the video image and the blurred image; predicting an amount of blur for each sub-image, comparing the predicted amount of blur an acceptable amount of blur in the video image, calculating a percent of sub-images that have a predicted blur greater than or equal to a first parameter, the percent representing a confidence that a whole of the video image is out of focus, and determining whether the video camera is in a state of focus based on whether the percent of the video image considered out of focus is greater than a second parameter.

According to an aspect of the present disclosure, a non-transitory computer readable storage medium is provided that stores a set of executable instructions for evaluating a focus status of a video camera. The executable instructions, when executed by the processor, cause operations to be performed by the processor, including receiving at a receiver a video image from a video server in accordance with a predetermined schedule, determining a focus classification procedure to perform on the received video image, classifying the focus status of the video image in accordance with the focus classification procedure and determining from the video image whether the video camera is in a state of focus, and clearing a warning count when the video image is determined to be in a state of focus and setting an alarm indication when the warning count exceeds a predetermined threshold.

According to another aspect of the present disclosure the operations further include incrementing the warning count a first time when the video image is determined to be in a state of non-focus as a result of a first determination, and setting a warning status when the warning count is incremented.

According to another aspect of the present disclosure, the operations further include clearing the incremented count when the video image is determined to be in a state of focus as a result of a second determination.

According to another aspect of the present disclosure the operations further include incrementing the warning count a second time when the video image is determined to be in a state of focus as a result of a second determination, and setting the alarm indication when the warning count, incremented a second time, exceeds the predetermined threshold of at least two.

According to another aspect of the present disclosure, the operations further include selecting one or more distinct focus classification procedures, and classifying the focus status of an image of the video camera in accordance with the selected focus classification procedure.

According to another aspect of the present disclosure, the focus classification procedure includes incrementally building an estimate of a background of a scene, storing a reference image based on the estimate, retrieving the reference image, segmenting each of the video image and the reference image into a respective array of sub-images, calculating a focus metric for each sub-image of the video image and the reference image, comparing focus metrics between the sub-images of the video image and the sub-images of the reference image, calculating a percent of sub-images that have a focus metric difference of greater than a first parameter, and determining whether the video camera is in a state of focus based on whether a percent of the image that is out of focus is greater than a second parameter.

According to another aspect of the present disclosure the focus classification procedure includes segmenting the video image into an array of sub-images, calculating at least one metric associated with a focus determination for each sub-image, applying a blur to the video image to create a blurred image approximating what the video image may look like if the video camera were in an out of focus state, segmenting the blurred image in order to estimate how the at least one metric may change for an out of focused image, storing the video image and the blurred image; predicting an amount of blur for each sub-image, comparing the predicted amount of blur an acceptable amount of blur in the video image, calculating a percent of sub-images that have a predicted blur greater than or equal to a first parameter, the percent representing a confidence that a whole of the video image is out of focus, and determining whether the video camera is in a state of focus based on whether the percent of the video image considered out of focus is greater than a second parameter.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for evaluating a focus status of a camera, the system comprising:
   a processor; and
   a memory storing instructions that, when executed by the processor, cause the processor to perform operations including:
      storing a reference image in the memory based on first image data received from the camera;
      receiving second image data from the camera in accordance with a predetermined schedule;
      segmenting each of a test image of the second image data and the reference image into a respective array of sub-images;
      calculating a sub-image focus metric for each sub-image of the test image and the reference image;
      comparing focus metrics between the sub-images of the test image and the sub-images of the reference image;
      determining whether the camera is in a state of focus based on a result of the comparing of the focus metrics;
      changing a focus of the camera when the camera is determined not to be in the state of focus; and
      storing a new reference image in the memory based on third image data received from the camera, the third image data being received after changing the focus of the camera.

2. The system according to claim 1, wherein the operations further include:
   outputting an alarm report including the reference image, the test image, and the new reference image.

3. The system according to claim 1, wherein the operations further include:
   clearing a warning count when the camera is determined to be in the state of focus; and
   setting an alarm indication when the warning count exceeds a predetermined threshold.

4. The system according to claim 1, further comprising:
   a display,
   wherein the operations further include:
      displaying, on the display, the reference image, the test image, and the new reference image.

5. The system according to claim 4, wherein
   the reference image, the test image, and the new reference image are simultaneously displayed on the display, with the test image being between the reference image and the new reference image.

6. The system according to claim 4, wherein
   the new reference image is stored in the memory after changing the focus of the camera in response to an acceptance message being received while the reference image, the test image, and the new reference image are displayed on the display.

7. The system according to claim 1, wherein
   the test image is captured by the camera.

8. The system according to claim 1, wherein
   the second image data includes a plurality of images captured by the camera, and
   the test image is generated from the plurality of images.

9. The system according to claim 8, wherein
   the test images is a background image generated from the plurality of images.

10. The system according to claim 1, wherein
    the new reference image is captured by the camera.

11. A system for evaluating a focus status of a camera, the system comprising:
    a processor; and
    a memory storing instructions that, when executed by the processor, cause the processor to perform operations including:
       storing a reference image in the memory based on first image data received from the camera;
       receiving second image data from the camera in accordance with a predetermined schedule;
       classifying a focus status of a test image of the second image data;
       determining whether the camera is in a state of focus based on the focus status of the test image;
       changing a focus of the camera when the camera is determined not to be in the state of focus; and
       storing a new reference image in the memory based on third image data received from the camera, the third image data being received after changing the focus of the camera, wherein
    the camera waits for foreground objects to disappear before capturing the new reference image, and
    the new reference image is captured in a state having no foreground objects.

12. A method for evaluating a focus status of a camera, the method comprising:
    storing, in a memory, a reference image based on first image data received from the camera;
    receiving second image data from the camera in accordance with a predetermined schedule;
    segmenting, by a processor, each of a test image of the second image data and the reference image into a respective array of sub-images;
    calculating, by the processor, a sub-image focus metric for each sub-image of the test image and the reference image;
    comparing, by the processor, focus metrics between the sub-images of the test image and the sub-images of the reference image;
    determining, by the processor, whether the camera is in a state of focus based on a result of the comparing of the focus metrics;

changing a focus of the camera when the camera is determined not to be in the state of focus; and storing, in the memory, a new reference image based on third image data received from the camera, the third image data being received after changing the focus of the camera.

13. The method according to claim 12, further comprising:

outputting an alarm report including the reference image, the test image, and the new reference image.

14. The method according to claim 12, further comprising:

clearing a warning count when the camera is determined to be in the state of focus; and setting an alarm indication when the warning count exceeds a predetermined threshold.

15. A non-transitory computer readable storage medium that stores a set of executable instructions for evaluating a focus status of a camera, the set of executable instructions, when executed by a processor, causing operations to be performed, the operations comprising:

storing a reference image based on first image data received from the camera;

receiving second image data from the camera in accordance with a predetermined schedule;

segmenting each of a test image of the second image data and the reference image into a respective array of sub-images;

calculating a sub-image focus metric for each sub-image of the test image and the reference image;

comparing focus metrics between the sub-images of the test image and the sub-images of the reference image;

determining whether the camera is in a state of focus based on a result of the comparing of the focus metrics;

changing a focus of the camera when the camera is determined not to be in the state of focus; and storing a new reference image based on third image data received from the camera, the third image data being received after changing the focus of the camera.

16. The non-transitory computer readable storage medium according to claim 15, wherein the operations further comprise:

outputting an alarm report including the reference image, the test image, and the new reference image.

17. The non-transitory computer readable storage medium according to claim 15, wherein the operations further comprise:

clearing a warning count when the camera is determined to be in the state of focus; and setting an alarm indication when the warning count exceeds a predetermined threshold.

* * * * *